United States Patent
Hassani

(10) Patent No.: US 10,576,934 B2
(45) Date of Patent: Mar. 3, 2020

(54) DECENTRALIZED CLOUD-BASED AUTHENTICATION FOR AUTONOMOUS VEHICLES

(71) Applicant: Ford Global Technologies, LLC, Dearborn, MI (US)

(72) Inventor: Ali Hassani, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/041,276

(22) Filed: Jul. 20, 2018

(65) Prior Publication Data

US 2020/0023812 A1    Jan. 23, 2020

(51) Int. Cl.
| | | |
|---|---|---|
| B60R 25/25 | (2013.01) | |
| G06K 9/00 | (2006.01) | |
| H04L 29/06 | (2006.01) | |
| G05D 1/00 | (2006.01) | |
| G06Q 50/30 | (2012.01) | |
| G07C 5/00 | (2006.01) | |
| H04L 29/08 | (2006.01) | |
| G06Q 10/02 | (2012.01) | |

(52) U.S. Cl.
CPC .......... *B60R 25/25* (2013.01); *G05D 1/0088* (2013.01); *G06K 9/00288* (2013.01); *G06Q 10/02* (2013.01); *G06Q 50/30* (2013.01); *G07C 5/008* (2013.01); *H04L 63/0807* (2013.01); *H04L 63/0861* (2013.01); *H04L 67/12* (2013.01); *B60R 2325/205* (2013.01); *G05D 2201/0213* (2013.01)

(58) Field of Classification Search
None
See application file for complete search history.

(56) References Cited

U.S. PATENT DOCUMENTS

| | | | |
|---|---|---|---|
| 7,139,917 B2 | 11/2006 | Jablon | |
| 9,501,881 B2 | 11/2016 | Saeedi et al. | |
| 2005/0188213 A1* | 8/2005 | Xu | G06K 9/00087 |
| | | | 713/186 |
| 2017/0017963 A1* | 1/2017 | Cho | G06Q 20/325 |
| 2017/0316533 A1 | 11/2017 | Goldman-Shenhar et al. | |
| 2019/0051069 A1* | 2/2019 | Cooley | G06K 9/00805 |
| 2019/0058596 A1* | 2/2019 | Chang | H04L 9/3247 |

FOREIGN PATENT DOCUMENTS

| | | |
|---|---|---|
| CN | 103921759 B | 2/2017 |
| CN | 107600032 A | 1/2018 |
| EP | 3185219 A1 | 6/2017 |

* cited by examiner

*Primary Examiner* — Carlos Garcia
(74) *Attorney, Agent, or Firm* — Brandon Hicks; Eversheds Sutherland (US) LLP

(57) ABSTRACT

Systems, methods, and computer-readable media are disclosed for decentralized authentication for autonomous vehicles. Example autonomous vehicles may include at least one memory storing computer-executable instructions, and one or more computer processors coupled to the at least one memory. The one or more computer processors may be configured to execute the computer-executable instructions to receive biometric data of a user, determine extracted feature data using the biometric data, send the extracted feature data to a first server, and receive an access token from a second server. The access token may indicate the extracted feature data matched stored data associated with a user account of the user.

10 Claims, 5 Drawing Sheets

US 10,576,934 B2

DECENTRALIZED CLOUD-BASED AUTHENTICATION FOR AUTONOMOUS VEHICLES

TECHNICAL FIELD

The present disclosure relates to systems, methods, and computer-readable media for decentralized cloud-based authentication for autonomous vehicles.

BACKGROUND

Users may be interested in using autonomous vehicles for transportation. However, because a human driver may not be present in an autonomous vehicle, authentication of a rider's identity may be important, so as to ensure the user is in the correct autonomous vehicle. To authenticate a rider, personally identifiable information may be used. However, such information may be susceptible to hacking and/or other cyber security threats.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ certain embodiments of the disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for certain applications. Various combinations and modifications of the features consistent with the teachings of this disclosure, however, could be desired for particular applications or implementations.

Figure 1:
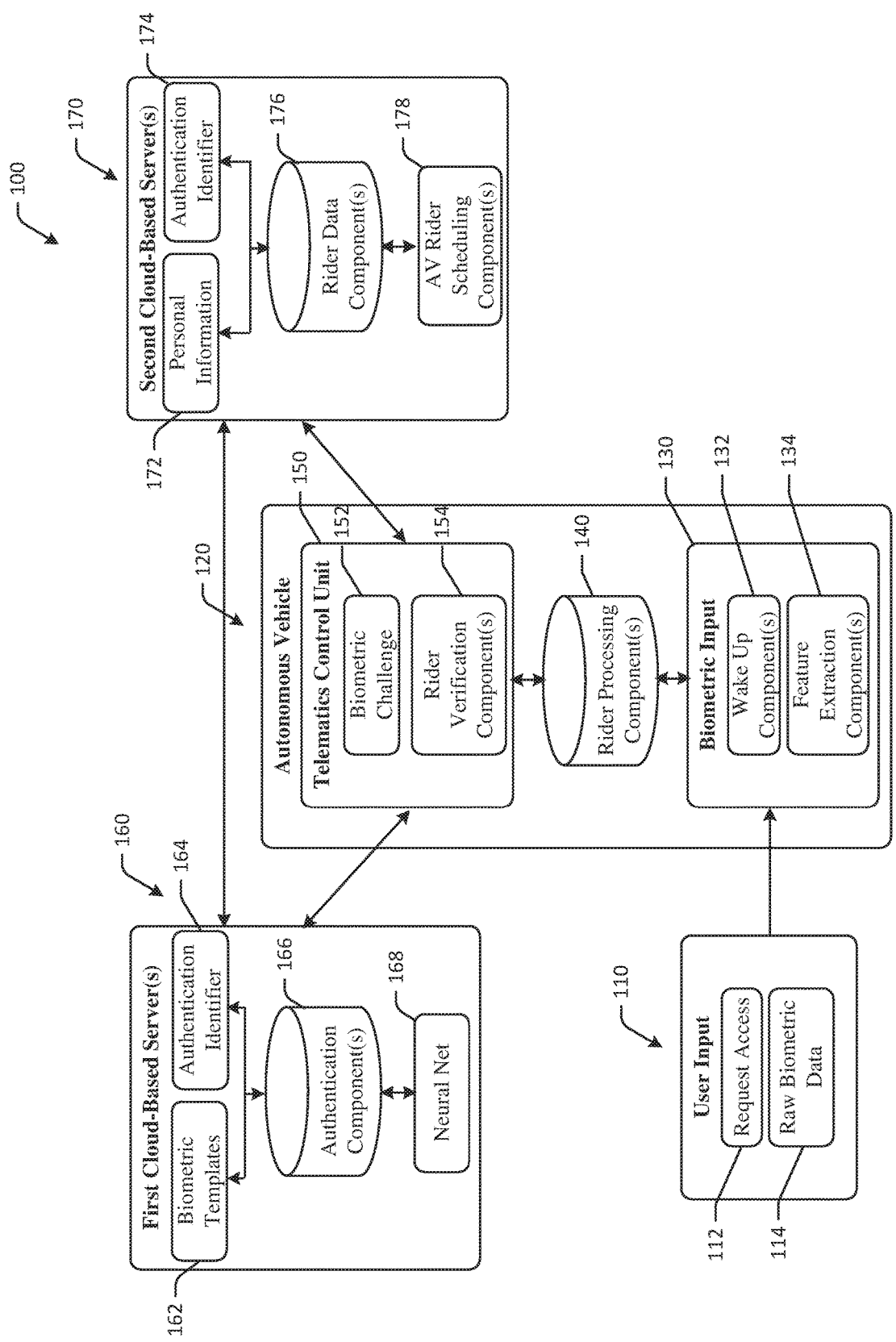
FIG. 1 is a schematic illustration of an example implementation of decentralized cloud-based authentication for autonomous vehicles in accordance with one or more embodiments of the disclosure.

FIG. 1 is a schematic illustration of an example implementation 100 of decentralized cloud-based authentication for autonomous vehicles in accordance with one or more embodiments of the disclosure. Although the example of FIG. 1 illustrates a system with two discrete cloud-based servers, other embodiments may include a different number of servers or server systems. Example server architecture is described with respect to at least FIG. 5.

Rider authentication may be important for autonomous vehicles because a human operator may not be available to verify a rider's identity. This may result in a rider entering the wrong autonomous vehicle, a rider being driven to an incorrect destination, and so forth. Some methods of rider verification use biometric features, such as facial features, fingerprints, gait analysis, and the like. However, such data may be desired by hackers and other cybersecurity threats. Accordingly, safeguarding information used to verify rider identity may be desired.

Embodiments of the disclosure provide systems and methods of managing biometric data so as to reduce or remove a threat of unauthorized access to the biometric data that may be used for rider authentication. Certain embodiments use a plurality of discrete cloud-based servers to separate storage of biometric data and rider or user personal information. For example, a first cloud-based server and a separate, discrete second cloud-based server may be used to separately store biometric data and personal information. Embodiments of the disclosure thereby provide a solution to rider identity authentication without forcing a user to enroll at every single device (e.g., a reader, scanner, or other device for capturing biometric data, which may be a device of an autonomous vehicle, or a user device) that is used by the user for authenticating themselves. For example, if authentication determinations were made locally at devices associated with a particular vehicle, users would need to create an account at each device they wish to use for authentication. During the account creation process, users may have to create a baseline biometric template for the user that is stored at a local device and can be used for subsequent authentication, as discussed in detail below. Enrollment is described in detail with respect to FIG. 3, and may be a process by which a user can create a profile with a biometric template that can be used for subsequent biometric authentication. Enrollment may be the initial account creation process. Embodiments of the disclosure include a decentralized biometric authentication system that can be scaled to any desired demand.

Embodiments of the disclosure include systems and methods, as well as autonomous vehicles, that include functionality including authentication of riders without human input. Some embodiments may use more than one cloud-based server or server system (e.g., group of servers) to store data and/or authenticate a rider. Accordingly, embodiments of the disclosure may automatically verify user identity without providing access to both rider personal information (e.g., account information) and biometric data in the event of a breach.

As an overview, embodiments of the disclosure may include an autonomous vehicle 120, a first server 160, and a second server 170. A user may request, using a mobile application executing on a user device in an example, an autonomous vehicle ride. The request may be sent to the second server 170. In some instances, the request may include a user account identifier associated with a user account from which the request was made. The second server 170 may receive the request and may determine the user account identifier. The second server 170 may be in communication with one or more local or remote datastores storing user account identifiers in association with authentication identifiers (which may be an anonymous identifier devoid of personally identifiable information associated with a user and/or user account) for the respective user accounts. The second server 170 may query the one or more databases to determine the authentication identifier that is associated with the user account identifier from the request. The second server 170 may then wait for a message from the first server 160 indicating that a biometric challenge has been satisfied. The message from the first server 160 may include an authentication identifier. If the authentication identifier that is received by the second server 170 from the first server 160 matches the authentication identifier determined by the second server 170 (using the user account identifier), the second server 170 may send an access token to an autonomous vehicle or to a user device to grant access to the autonomous vehicle for the user. The process by which the first server 160 determines whether a biometric challenge is satisfied is described below.

To authenticate a rider using a biometric challenge, a user device (e.g., smartphone, smartwatch, etc.) or a device associated with the autonomous vehicle 120, such as a camera, fingerprint scanner, microphone, etc. may be used to capture one or more biometric features of a user that is approaching or is at the autonomous vehicle 120. The autonomous vehicle 120 or the user device may include one or more computer processors or controllers that process the biometric feature input and determine a set of extracted feature data, which may represent a symmetry of the user's face, facial depth features, skin tone analysis, fingerprint features, etc. The extracted feature data may be sent to the first server 160 for matching against a database of existing biometric templates for users. The biometric templates may include extracted feature data for users that have created user accounts for biometric authentication. The first server 160 may determine a biometric template that matches the extracted feature data received from the autonomous vehicle 120. The identified biometric template may be associated with an authentication identifier that is unique to the user. The authentication identifier may be sent by the first server 160 to the second server 170 in a message. As discussed above, the second server 170 may determine that the authentication identifiers match, and may grant access to the autonomous vehicle by sending an access token to the user's device or the autonomous vehicle.

In FIG. 1, a user may approach and/or enter an autonomous vehicle. The user may make a number of user inputs 110 to initiate a verification process. For example, the user may request access 112 (e.g., via a door handle or entry pad at a vehicle, via a mobile application interface, via vehicular detection of the mobile device via wireless communication, via a verification device inside the vehicle, etc.). In some embodiments, access may be requested by physically contacting or touching an autonomous vehicle 120, while in other embodiments, access may be requested using voice commands, detection of a user device using wireless communication such as Bluetooth or Near Field Communication, or other non-physical user inputs.

To gain access to the autonomous vehicle 120, the user may input raw biometric data 114, which may be an image (e.g., a selfie, etc.), a video of the user walking or making a particular face, audio recordings of their speech, fingerprint image or sensor output, and so forth. The raw biometric data 114 may be captured by a component of an autonomous vehicle, or may be captured by the user's device once the user is in proximity to a certain autonomous vehicle. For example, the user may capture a selfie using the user's smartphone, or a vision system at the autonomous vehicle may be used to capture a selfie of the user for authentication of the user's identity. Similarly, an audible message may be used in another form of biometric data, and may be used to authenticate the rider based at least in part on features of the voice data extracted from the audible message. In some embodiments, the user may be able to use their own device to capture biometric data input, such as instances where the user's device is connected to the autonomous vehicle using a wireless connection, such as Bluetooth or NFC. An autonomous vehicle 120 may receive the user inputs 110. The autonomous vehicle 120 may include a biometric input system 130, a rider processing component 140, and a telematics control unit 150. The biometric input system 130 may receive the user inputs 110 and may include one or more wake up components 132 to wake the autonomous vehicle 120 when (e.g., during or after, etc.) based on the requested access 112, such as, by the user approaches or contacts the autonomous vehicle 120. Wake up of the vehicle may include starting an engine, initiating a display, presenting one or more user interfaces, and the like. In some instances, the vehicle may not need to be woken up and may remain in an awake state.

The biometric input system 130 (e.g., cameras, infrared sensors, facial recognition systems, fingerprint sensors, microphones, etc.) may include one or more feature extraction components 134 that extracts biometric feature data or information from the raw biometric data 114 received as user inputs 110. For example, the feature extraction component 134 may extract facial symmetry features, depth features, and the like from an image or video of the user, fingerprint data from a fingerprint of the user, gait data from a gait analysis of a video of the user walking towards the video, gestures, spectral component analysis of speech, and/or other feature data. These features may also be generated through the use of a convolutional deep net and/or neural network, where higher order features may be abstracted from raw data sources such as video or audio recordings.

The extracted feature data may be provided to the rider processing component 140, which may be in communication with the biometric input system 130 and the telematics control unit 150. Extracted feature data may include numerical representations of a user's facial structure, unique traits of a user's fingerprint, voice patterns of a user, and the like. The rider processing component 140 may provide the feature data to, or may work in conjunction with, the telematics control unit 150 for a biometric challenge 152. The rider processing component 140 may have separate or shared computer processors with the telematics control unit 150. In some embodiments, the rider processing component 140 may be a separate computer system in communication with the telematics control unit 150. The telematics control unit 150 may be a computer system available locally at the vehicle 120 (and may correspond to the controller 406 of FIG. 4 in some embodiments).

The biometric challenge 152 may be used to capture biometric data that can be used by the first cloud-based server 160 to authenticate the user, that is, to determine whether the user is a particular user, such as an expected rider. An expected rider may be a rider that is associated with an account that ordered the autonomous vehicle, or a rider that was identified as a designated rider during the ordering process of the autonomous vehicle (e.g., a son may order an autonomous vehicle for his mother, etc.). To satisfy the biometric challenge 152, as an example, the extracted feature data may need to satisfy a threshold similarity comparison to stored biometric data. For example, extracted facial feature data may need to be a percentage match, for example, a 95% match (or any other suitable threshold similarity) to stored facial feature data for the particular user (as determined by the first cloud-based server 160, discussed below). Matches may be determined using a remote computer system in communication with the vehicle 120, such as a first cloud-based server 160, as described below. The telematics control unit 150 may include an optional rider verification component 154 that may be executed in addition to the biometric challenge 152. The rider verification component 154 may, in an example, prompt a user for a password, passcode, or other authentication credential for additional verification of the user identity. The rider verification component 154 may communicate extracted feature data of biometric data of a user to the rider processing component 140. In some embodiments, the rider verification component 154 may be executed to send extracted feature data to the first cloud-based server 160. For example, the rider verification component 154 may send the extracted feature data to the first cloud-based server 160 and may receive back from the second cloud-based server 170 data indicative of a positive or negative verification result (which may be in the form of an access token).

Figure 3:
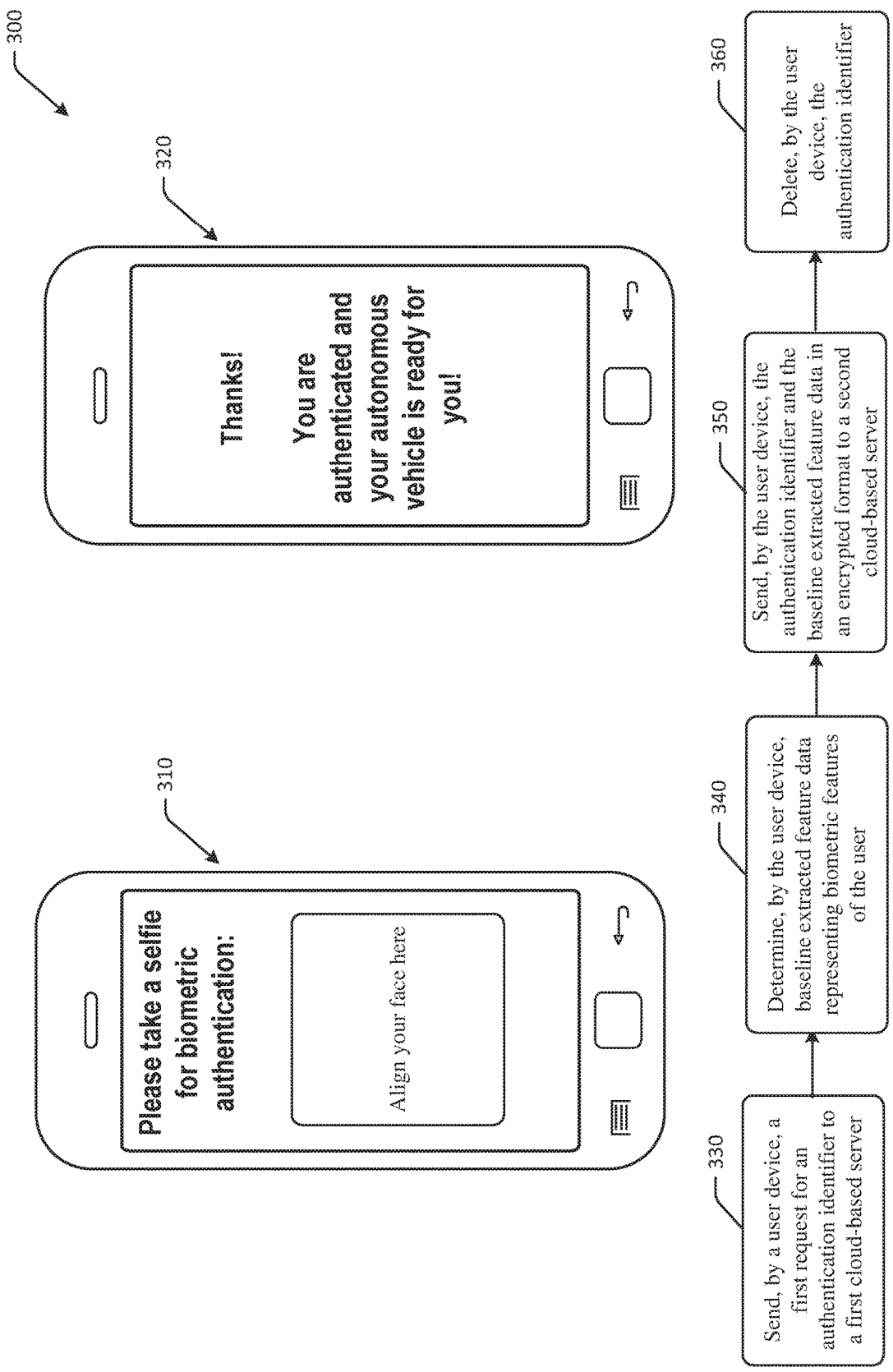
FIG. 3 are schematic illustrations of example user interfaces for decentralized cloud-based authentication for autonomous vehicles in accordance with one or more embodiments of the disclosure.
Figure 4:
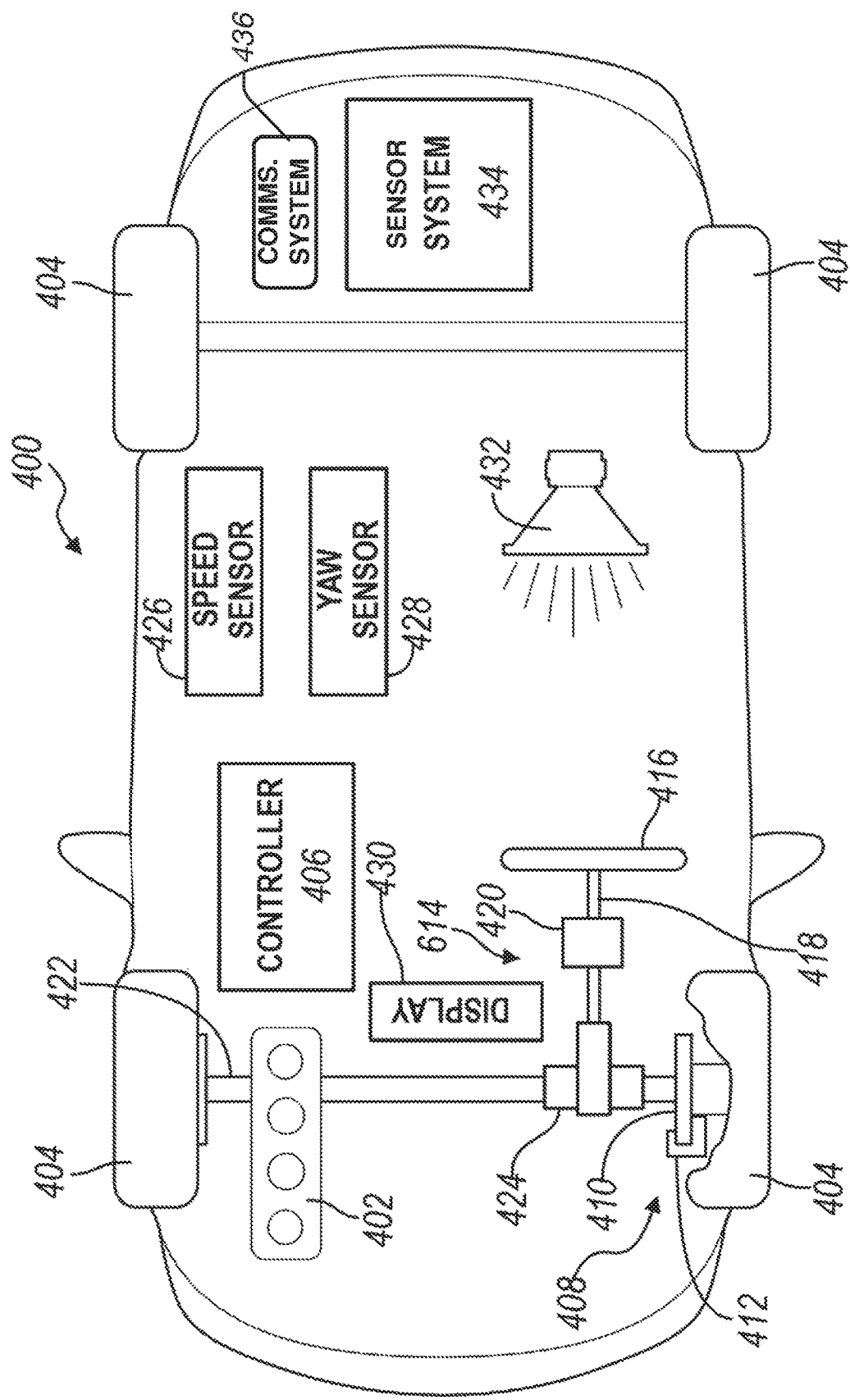
FIG. 4 is a schematic illustration of an example autonomous vehicle in accordance with one or more embodiments of the disclosure.

The telematics control unit 150 may be a computer system available locally at the vehicle 120 (and may correspond, for example, to the controller 406 in FIG. 4 in some embodiments). The telematics control unit 150 may communicate with the first cloud-based server or server system 160, which may be a biometric cloud system. The first cloud-based server 160 may be configured to verify a rider identity using extracted feature data that is received from the autonomous vehicle 120. For example, the first cloud-based server 160 may include an authentication component 166 that receives the extracted feature data from the autonomous vehicle 120 and may use the extracted feature data and one or more biometric templates (which may be stored baseline feature data for biometric features of a particular user captured during an enrollment process, as described with respect to FIG. 3) 162 as inputs at the authentication component 166. Biometric templates 162 may be templates or profiles that include baseline extracted biometric feature data for users that have enrolled in a biometric authentication service, an example of which is described with respect to FIG. 3.

The authentication component 166 may compare the extracted feature data to one or more of the biometric templates 162, and upon determining a suitable match, may determine the associated authentication identifier 164. For example, extracted facial feature data may need to be a percentage match, for example, a 95% match (or any other suitable threshold similarity) to stored facial feature data for the particular user. The authentication identifier 164 may be stored in a local or remote database in association with respective biometric templates. The authentication component 166 may use a recognition neural net 168 to improve performance of authentication tasks over time. For example, as matches are found by the first cloud-based server 160, subsequent matches may be found in reduced amounts of time by accounting for variance between extracted feature data for the same user (e.g., a selfie at a different angle, etc.). Any suitable machine learning algorithms may be used.

The authentication identifier 164 may not include any personally identifiable information in some embodiments. Rather, the authentication identifier 164 may be a randomly generated unique string of characters or images and may be associated with a particular biometric template 162. The biometric template is generated for the user during an enrollment process that allows the user to capture baseline biometric feature data that is then used for subsequent authentication for the user. For example, during enrollment, the user may take 5 different selfies from different angles. Features may be extracted from each of the 5 selfies and included in the biometric template for the user for subsequent authentication of the user.

The telematics control unit 150 may communicate with the first cloud-based server 160, and a second cloud-based server or server system 170 (which may be an autonomous vehicle cloud system). The first cloud-based server 160 and the second cloud-based server 170 may be in communication with each other to share authentication identifiers. The second cloud-based server 170 may be configured to determine a user's authentication identifier (e.g., by locating an authentication identifier associated with a user account in a database, etc.) and/or to grant access to an autonomous vehicle (e.g., by generating an access token that acts as a digital key to unlock an autonomous vehicle and/or initiate a trip, etc.). The second cloud-based server 170 may access one or more local or remote databases at which personal information 172 is stored in association with authentication identifiers 174.

For example, when a user is requesting an autonomous vehicle ride, the request may be sent to the second cloud-based server 170. The request may include a user account identifier, as discussed above. The second cloud-based server 170 may use one or more pieces of personal information that may be associated with the request (e.g., user account identifier, email address, device identifier (e.g., MAC address, serial number, etc.), home address, phone number, etc.) as inputs at one or more rider data components 176 (which may correspond to the rider verification module 526 of FIG. 5). The rider data component 176 may be a software component configured to access and/or query the one or more databases at which the personal information 172 and/or authentication identifiers 174 are stored in association with each other, so as to determine the authentication identifier that is associated with a particular piece of personal data. An example process of creating an authentication identifier for a user account is described with respect to FIG. 3. The rider data component 176 may be in communication with an autonomous vehicle rider scheduling service or component(s) 178 that may receive and/or process requests for autonomous vehicles for users (e.g., users may use a mobile application to schedule or request rides, etc.). The rider data component 176 may use the data (e.g., the user account identifier) received from the autonomous vehicle rider scheduling component 178 (which receives the ride request data from the user device, which may include the user account identifier) to determine an expected rider and/or other details for an expected rider of an autonomous vehicle. The expected rider may be a rider designated during a ride request using the user device when a user requests a ride.

If the authentication identifier determined by the second cloud-based server 170 (using the user account identifier associated with a ride request) matches the authentication identifier received by the second cloud-based server 170 from the first cloud-based server 160 (as determined using the extracted feature data), the rider may be authenticated and the autonomous vehicle or the user device may be sent an access token from the second cloud-based server 170 to access the autonomous vehicle and/or initiate a trip if the user is already inside the vehicle.

Figure 2:
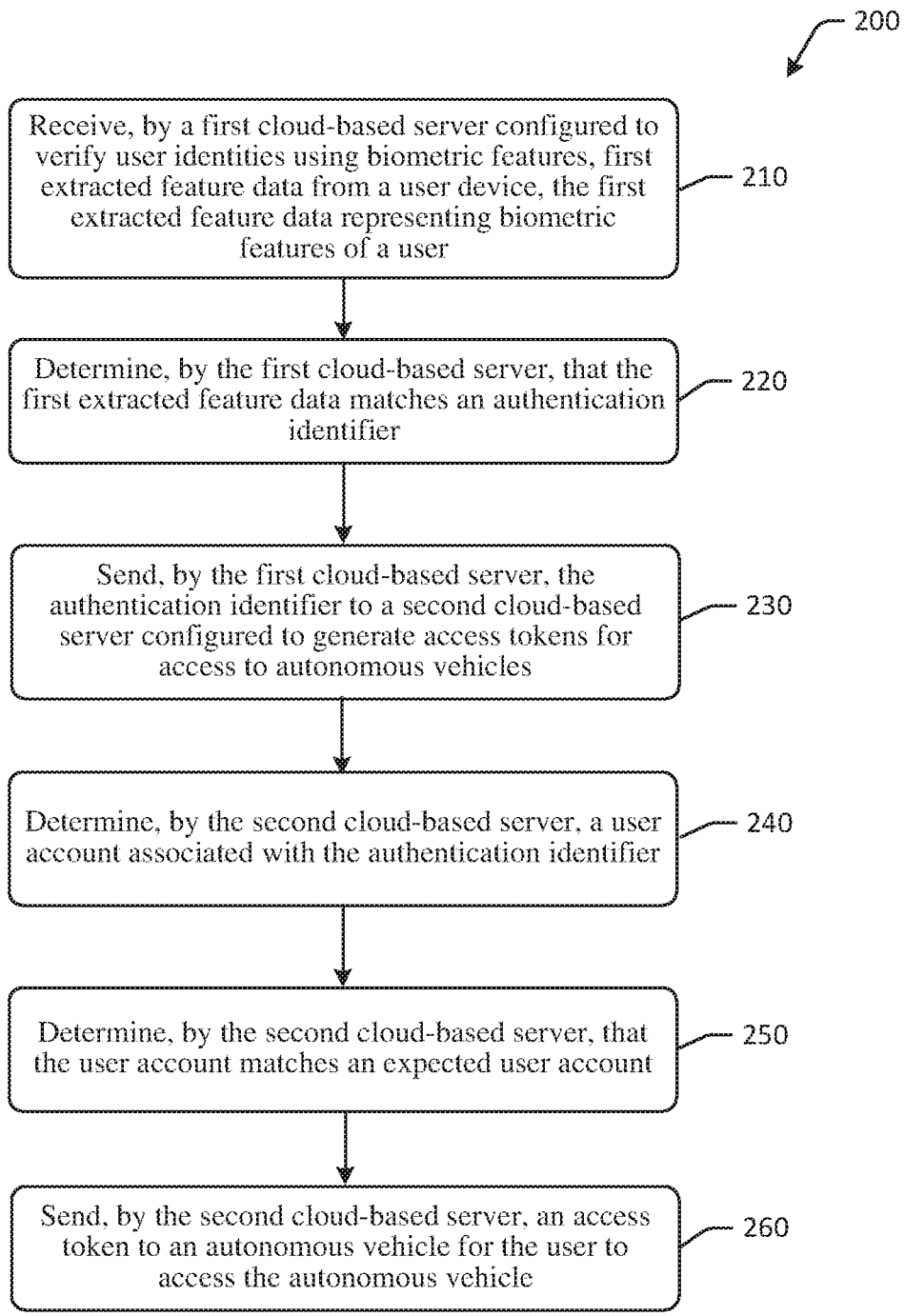
FIG. 2 is a schematic illustration of an example method for decentralized cloud-based authentication for autonomous vehicles in accordance with one or more embodiments of the disclosure.

A method of verifying rider identity using a decentralized system, such as that illustrated in FIG. 1, is discussed in detail with respect to FIG. 2. For example, the process may include receiving a user request for autonomous vehicle access, extracting biometric features of raw biometric data of the user, and then using separated and discrete cloud-based systems to process subsets of the total personal information data for verification.

Embodiments of the disclosure may minimize the amount of useful information that can be accessed illicitly by keeping incomplete data sets stored in different areas. In this manner, a hacker or other unauthorized individual would have to gain access to the first server or server system that stores the biometric templates and/or biometric data, the second server or server system that stores rider personal information, and subsequently know how the data sets are related together.

Certain embodiments may use raw biometric inputs that are publically available at low resolution. For example, 3D facial detection offers security, but also is information that is likely readily available with low resolution on the internet. Low resolution images would be insufficient to authenticate into the system, but would dis-incentivize attempts to hack into the biometric authentication server (as compared to recognizing fingerprint or iris features).

Accordingly, embodiments of the disclosure include a de-centralized cloud-based biometric authentication system that segregates biometric and personal data for security purposes. One cloud service may be utilized for matching a biometric with a registered user account or identifier, and a second, mutually disjointed, cloud service may retrieve the personal information of the user account or authentication identifier from one or more databases and grants autonomous vehicle access after determining that the authentication identifier matches personal information for an expected rider. For example, a rider may request an autonomous vehicle ride using a user account on an application executing on a mobile device. The second cloud-based server may receive the request (e.g., via the autonomous vehicle rider scheduling component 178, etc.), and may identify a designated autonomous vehicle for the user. When the user arrives at an autonomous vehicle, the autonomous vehicle may wireless communicate extracted biometric feature data to the first cloud-based server. The first cloud-based server may determine an authentication identifier associated with a biometric template matching the extracted biometric feature data (that was received from the autonomous vehicle). The first cloud-based server may then send the authentication identifier to the second cloud-based server (illustrated as authentication identifier 174 in FIG. 1). The second cloud-based server may determine an associated user account or other personal information associated with the authentication identifier received from the first cloud-based server. If the associated user account matches the user account (e.g., expected rider, etc.) that requested the autonomous vehicle ride, the second cloud-based server may send an access token to the autonomous vehicle. If the associated user account does not match the user account and/or expected rider, the second cloud-based server may send a wrong vehicle token to the autonomous vehicle and/or user device of the user. The wrong vehicle token may indicate the location of the correct autonomous vehicle designated for the user.

Additional benefits include enhanced security as a result of pre-processing the biometric data at the scanner and/or autonomous vehicle and only transmitting the extracted features, such that a hacker may be unable to intercept the raw biometric data or image.

FIG. 2 is a flow diagram of an example process flow 200 for decentralized cloud-based authentication for autonomous vehicles in accordance with one or more embodiments of the disclosure. Some of the blocks of FIG. 2 represent operations that may be performed or executed by the first cloud-based server 160, the second cloud-based server 170, and/or the autonomous vehicle 120 of FIG. 1. In some embodiments, the operations may be performed in a distributed manner across a plurality of computer systems.

Block 210 of the process flow 200 may include receiving, by a first cloud-based server configured to verify user identities using biometric features, first extracted feature data from a user device (e.g., a smartphone, tablet, a component of an autonomous vehicle, a camera, biometric reader, or other fixture coupled to a vehicle, etc.), the first extracted feature data representing biometric features of a user. For example, the first cloud-based server 160 in FIG. 1 may receive first extracted feature data from a user device (which may be positioned at and/or be an integral component of the autonomous vehicle 120, or may be a mobile device). The extracted feature data may include biometric features, such as facial depth analysis, facial symmetry analysis, skin tone analysis, and so forth. For example, the first extracted feature data may be derived from an image of the user's face, such as a selfie or other image.

Block 220 of the process flow 200 may include determining, by the first cloud-based server, that the first extracted feature data matches an authentication identifier. For example, the first cloud-based server 160 may first determine that the extracted feature data matches stored biometric feature data. The stored biometric feature data may be the baseline biometric data of users captured during an enrollment process, as described in FIG. 3. The first cloud-based server 160 may compare the extracted feature data to the stored biometric feature data to determine whether a match exists (e.g., whether there is a corresponding set of data stored in a database accessible to the server, etc.) Next, the first cloud-based server 160 may determine or identify the authentication identifier that is associated with the stored biometric feature data (e.g., in a particular biometric template, etc.). In one example, the first cloud-based server 160 may query a database to identify the authentication identifier that is associated with a particular biometric template and/or extracted feature data. In some instances, the first cloud-based server 160 may determine whether the first extracted feature data matches the authentication identifier and/or stored biometric data of an expected rider. As discussed, the expected rider may be a user account associated with a request for an autonomous vehicle, or another user identified in an autonomous vehicle request. For example, when a user is making a request for an autonomous vehicle using an application on a mobile device, the user may either designate themselves or another user as the rider for the trip. The designated rider may be the expected rider. In other embodiments, the expected rider may be unknown. For example, the second cloud-based server may generate an access token based only on the authentication identifier received from the first cloud-based server and the personal information, which may not include the designated rider data. The first cloud-based server may use a neural net or other machine learning process that may be executable at a connected computer system for user identity authentication and/or to improve performance over time.

Block 230 of the process flow 200 may include sending, by the first cloud-based server, the authentication identifier to a second cloud-based server configured to generate rider verification or access tokens for access to autonomous vehicles. For example, after the first cloud-based server determines the authentication identifier of the user (using the extracted feature data), the first cloud-based server may send the authentication identifier to the second cloud-based server 170 in the example of FIG. 1. The second cloud-based server 170 may be configured to grant access to the autonomous vehicle 120, which may be done in one example by generating a rider verification token for access to autonomous vehicles. The rider verification or access token may be sent to the autonomous vehicle to grant the user access. The autonomous vehicle may determine that the access token matches an expected key value, which may be a digital key or character string acting as a key to access the autonomous vehicle. The autonomous vehicle may then unlock one or more doors and/or otherwise grant the user entry to the autonomous vehicle and/or begin a trip after receiving the access token. In some embodiments, the access token may be sent to a user device which can then be used by the user to access an autonomous vehicle. The vehicle may receive the access token from the user device and may grant the user access to the vehicle and/or begin the trip. The access token may be a digital key that is used by the autonomous vehicle to determine whether to grant access to a user. For example, the access token may be compared to a passkey or other value to determine if there is a match, and if so, access may be granted.

Block 240 of the process flow 200 may include determining, by the second cloud-based server, a user account associated with the authentication identifier. For example, the second cloud-based server 170 of FIG. 1 may determine a user account associated with the authentication identifier. The authentication identifier may be associated with a user account in one or more databases accessible by the second cloud-based server. The authentication identifier may be associated with the extracted feature set in the first cloud-based server. In this manner, the association between the user account and the extracted feature data for a user may be indirectly made using an authentication identifier that is passed between the first cloud-based server and the second cloud-based server. In some embodiments, the authentication identifier is only accessible by the first cloud-based server and the second cloud-based server. For example, the autonomous vehicle 120 may never receive and/or access the authentication identifier. In some instances, the user device used to capture biometric input may not access or receive the authentication identifier after initiation of a user account.

Block 250 of the process flow 200 may include determining, by the second cloud-based server, that the user account matches an expected user account. For example, the second cloud-based server 170 of FIG. 1 may determine that the identified user account matches an expected user account. An expected user account may be a user account from which a ride request or permission request was received. For example, the second cloud-based server may communicate with an autonomous vehicle scheduling system or service to determine a user account that is associated with a ride request and/or a user that is designated as a rider during a ride request. The designated rider and/or user account information may be used to determine an expected rider of the autonomous vehicle.

If the second cloud-based server determines that the user account does not match an expected user account, the second cloud-based server may send a wrong rider token to the autonomous vehicle. The wrong rider token may indicate that the autonomous vehicle 120 is not designated for the user. In some embodiments, the wrong rider token may include additional data, such as data related to a location of a different autonomous vehicle for the user. For example, the autonomous vehicle designated for the user may be further down or ahead in a taxi queue or autonomous vehicle line. The user may reattempt to access the correct autonomous vehicle after locating it.

Block 260 of the process flow 200 may include sending, by the second cloud-based server, a rider verification or access token to an autonomous vehicle for the user to access the autonomous vehicle. For example, the second cloud-based server 170 of FIG. 1 may generate and/or send a rider verification token to the autonomous vehicle 120 for the user to access and/or use the autonomous vehicle 120. The access token may by dynamically generated and may be used by the autonomous vehicle 120 (specifically the controller of the vehicle) to compare to an expected value to determine whether the access token matches the expected value. If so, the vehicle may unlock itself to grant access to the user and/or initiate a trip in accordance with the user's ride request.

In some embodiments, the method may optionally include deleting, by the second cloud-based server, the authentication identifier and/or data associated with the ride request after sending the rider verification token to the autonomous vehicle. For example, the second cloud-based server may not store the authentication identifier in long-term memory after the authentication identifier is received from the first cloud-based server. In some instances, data associated with a ride request, such as user account identifiers, may be deleted automatically after an access token is sent by the second cloud-based server.

In some embodiments, during an enrollment process and/or during an authentication process, the first cloud-based server may send the authentication identifier to the user device for storage in RAM memory. The user device may therefore delete the authentication identifier in due course. In some embodiments, the user device may send the authentication identifier to the second cloud-based server prior to deletion.

In an example, biometric authentication may be initiated by the user waking up the autonomous vehicle and/or biometric reader and following the recognition process. Wake up could be triggered by grasping the door handle, having the vehicle pair with the rider's phone, and having a parked vehicle's environmental sensors (such as LIDAR) determine a person is within a small distance of a door.

The autonomous vehicle and/or biometric reader may analyze the scanned data into the model feature inputs needed. Standard facial features may include detecting edges to associate the shape of a face, tracking facial proportions (e.g., relative distance between eyes and length of nose, etc.), blood vessel patterns detected by infrared, and/or changes in 3D depth detected by bi-focal lenses or ultrasonic sensors (e.g., how relative ratio of how far cheeks protrude vs eye recession, etc.). These extracted features may be encrypted and sent as an authentication challenge to the first cloud-based server (e.g., biometric server).

The first cloud-based server may compare the received encrypted features against one or more template repositories. If no match is found, the first cloud-based server may communicate to the vehicle to request a new biometric scan. In some instances, the autonomous vehicle 120 and/or user device may include an indicator to provide feedback, such as flashing a red LED. This process could be repeated iteratively until (i) the rider is authenticated, (ii) a finite waiting period (to accommodate current riders in the vehicle), and/or (iii) a finite number of rejections. Decision making logic at the autonomous vehicle 120 may be implemented in instances where no valid rider be found. In instances where the first cloud-based server finds a match, the first cloud-based server may transmit the associated authentication token to the second cloud-based server. The second cloud-based server may retrieve the rider personal information associated with the authentication token. If the authentication token matches the expected rider and/or expected user account, the second cloud-based server may send a rider verification token to the autonomous vehicle to grant access and continue with/initiate a trip. If the authentication token does not match the expected rider and/or user account, the second cloud-based server sends a wrong rider token to the vehicle, informing it is someone else. If desired, the vehicle may send a greeting and/or other information informing the user that they have a different vehicle and where it is, via visual or audio systems of the autonomous vehicle and/or user device.

In some embodiments, the autonomous vehicle may never receive the authentication identifier. The authentication identifier may be shared only between the biometric authentication server (e.g., first cloud-based server) and the second cloud-based server. In such embodiments, there should not be any individual computer system where the complete data set of raw biometric data, authentication identifier, and personal information exists.

FIG. 3 is a schematic illustration of example user interfaces 300 for decentralized cloud-based authentication for autonomous vehicles in accordance with one or more embodiments of the disclosure.

At a first user interface 310, a user device may be used for capturing raw biometric data for a user input. For example, the user device may be the user's own mobile device, or may be a device at an autonomous vehicle. The biometric data may be an image, such as an image of the user's face. The captured biometric data (or extracted features from the biometric data, such as a numerical representation of unique biometric features of the user) may be sent to the first cloud-based server 160 in FIG. 1 and stored as part of a biometric template for the user. The biometric template may be stored in association with a unique authentication identifier for the user. Biometric templates 162 in FIG. 1 may include baseline extracted biometric feature data for users that have enrolled in the biometric authentication service.

At a second user interface 320, a confirmation message may indicate that the user is authenticated and may indicate that the user may access a particular autonomous vehicle.

FIG. 3 includes an example process flow for enrolling in a biometric authentication service for autonomous vehicles.

Block 330 may include sending, by a user device comprising one or more computer processors coupled to at least one memory, a first request for an authentication identifier to a first cloud-based server. In this example, the first cloud-based server may be the second cloud-based server 170 of FIG. 1. The authentication identifier may be associated with a first user account for a user of an autonomous vehicle. The request for the authentication identifier may optionally include initially captured extracted feature data that may be used for subsequent rider authentication.

Block 340 may include determining, by the user device, baseline extracted feature data representing biometric features of the user. For example, the user device may capture a number of images of a user's face to determine baseline, or initial, extracted feature data that can be used for subsequent authentication for the rider.

Block 350 may include sending, by the user device, the authentication identifier and the baseline extracted feature data in an encrypted format to a second cloud-based server. The second cloud-based server may be configured to use the baseline extracted feature data for biometric authentication.

In this example, the second cloud-based server may be the first cloud-based server 160 of FIG. 1. The user device may receive the authentication identifier from the first cloud-based server (which may optionally be received responsive to the first request at block 330) and/or may generate the authentication identifier, and may send the authentication identifier and optionally the baseline extracted feature data to the second cloud-based server.

Block 360 may include deleting, by the user device, the authentication identifier. For example, the authentication identifier may be stored in RAM memory and may be deleted in due course or actively by the user device once the authentication identifier is sent to the second cloud-based server. In some embodiments, the authentication identifier may be received from the first cloud-based server, and may be stored in RAM memory.

In some instances, the user device and/or autonomous vehicle may determine an image of the user, determine first extracted feature data using the image, and send a biometric authentication request to the second cloud-based server. The biometric authentication request may include the first extracted feature data.

In some embodiments, the first cloud-based server, the second cloud-based server, and the user device do not send the authentication identifier to the autonomous vehicle. This is so as to avoid the biometric data, personal information, and authentication identifier being available at the autonomous vehicle.

In an example process flow for enrollment, enrollment may be initiated when a user creates an account on a mobile application using a device. The device may connect to a rider verification server (such as the second cloud-based server 170 in FIG. 1) to generate a personal profile, which may include the desired personal information of a user, as well as the generation of an authentication identifier. The rider verification server may generate a random unique authentication identifier for the user and associate it with the personal information. This authentication identifier may be sent to the user's device for temporary storage in RAM. This is because the authentication identifier may be automatically deleted from the user's device once enrollment is complete.

Once the user creates an account, the device may request the user to enroll their biometric data. The device may perform the feature extraction discussed with respect to FIG. 3, and ask for a secondary "selfie" or other input to verify the model can recognize them. This "selfie" enrollment process may be repeated until the recognition test is successful. After a quality reference data set is acquired (e.g., the baseline extracted feature data) the device sends a new account request to the biometric authentication server (such as the first cloud-based server 160 in FIG. 1), providing an encrypted version of the extracted features and the authentication identifier. The authentication identifier is then erased from the device memory. The biometric authentication server receives the new account request and creates a user account for the user in which the authentication identifier is associated with the extracted features in the form of a biometric template.

Referring to FIG. 4, an example autonomous vehicle 400 (which may correspond to the autonomous vehicle 110 of FIGS. 1A-1C) includes a power plant 402 (such as a combustion engine and/or an electric motor) that provides torque to driven wheels 404 that propel the vehicle forward or backward. Once an access token is received by an autonomous vehicle from the second cloud-based server, the autonomous vehicle may unlock itself and/or initiate a trip by driving to a destination indicated by the user during a ride request input.

Autonomous vehicle operation, including propulsion, steering, braking, navigation, and the like, may be controlled autonomously by a vehicle controller 406. For example, the vehicle controller 406 may be configured to receive feedback from one or more sensors (e.g., sensor system 434, etc.) and other vehicle components to determine road conditions, vehicle positioning, and so forth. The vehicle controller 406 may also ingest data form speed monitor and yaw sensor, as well as the tires, brakes, motor, and other vehicle components. The vehicle controller 406 may use the feedback and route/map data of the route to determine actions to be taken by the autonomous vehicle, which may include operations related to the engine, steering, braking, and so forth. Control of the various vehicle systems may be implemented using any suitable mechanical means, such as servo motors, robotic arms (e.g., to control steering wheel operation, acceleration pedal, brake pedal, etc.), and so forth. The controller 406 may be configured to process the route data for a neighborhood tour, and may be configured to interact with the user via the user interface devices in the car and/or by communicating with the user's user device.

The vehicle controller 406 may include one or more computer processors coupled to at least one memory. The vehicle 400 may include a braking system 408 having disks 410 and calipers 412. The vehicle 400 may include a steering system 414. The steering system 414 may include a steering wheel 416, a steering shaft 418 interconnecting the steering wheel to a steering rack 420 (or steering box). The front and/or rear wheels 404 may be connected to the steering rack 420 via axle 422. A steering sensor 424 may be disposed proximate the steering shaft 418 to measure a steering angle. The vehicle 400 also includes a speed sensor 426 that may be disposed at the wheels 404 or in the transmission. The speed sensor 426 is configured to output a signal to the controller 406 indicating the speed of the vehicle. A yaw sensor 428 is in communication with the controller 406 and is configured to output a signal indicating the yaw of the vehicle 400.

The vehicle 400 includes a cabin having a display 430 in electronic communication with the controller 406. The display 430 may be a touchscreen that displays information to the passengers of the vehicle and/or functions as an input, such as whether or not the rider is authenticated. A person having ordinary skill in the art will appreciate that many different display and input devices are available and that the present disclosure is not limited to any particular display. An audio system 432 may be disposed within the cabin and may include one or more speakers for providing information and entertainment to the driver and/or passengers. The audio system 432 may also include a microphone for receiving voice inputs. The vehicle may include a communications system 436 that is configured to send and/or receive wireless communications via one or more networks. The communications system 436 may be configured for communication with devices in the car or outside the car, such as a user's device, other vehicles, etc.

The vehicle 400 may also include a sensor system for sensing areas external to the vehicle. The vision system may include a plurality of different types of sensors and devices such as cameras, ultrasonic sensors, RADAR, LIDAR, and/or combinations thereof. The vision system may be in electronic communication with the controller 406 for controlling the functions of various components. The controller may communicate via a serial bus (e.g., Controller Area Network (CAN)) or via dedicated electrical conduits. The controller generally includes any number of microprocessors, ASICs, ICs, memory (e.g., FLASH, ROM, RAM, EPROM and/or EEPROM) and software code to co-act with one another to perform a series of operations. The controller also includes predetermined data, or "look up tables" that are based on calculations and test data, and are stored within the memory. The controller may communicate with other vehicle systems and controllers over one or more wired or wireless vehicle connections using common bus protocols (e.g., CAN and LIN). Used herein, a reference to "a controller" refers to one or more controllers and/or computer processors. The controller 406 may receive signals from the vision system 434 and may include memory containing machine-readable instructions for processing the data from the vision system. The controller 406 may be programmed to output instructions to at least the display 430, the audio system 432, the steering system 424, the braking system 408, and/or the power plant 402 to autonomously operate the vehicle 400.

Figure 5:
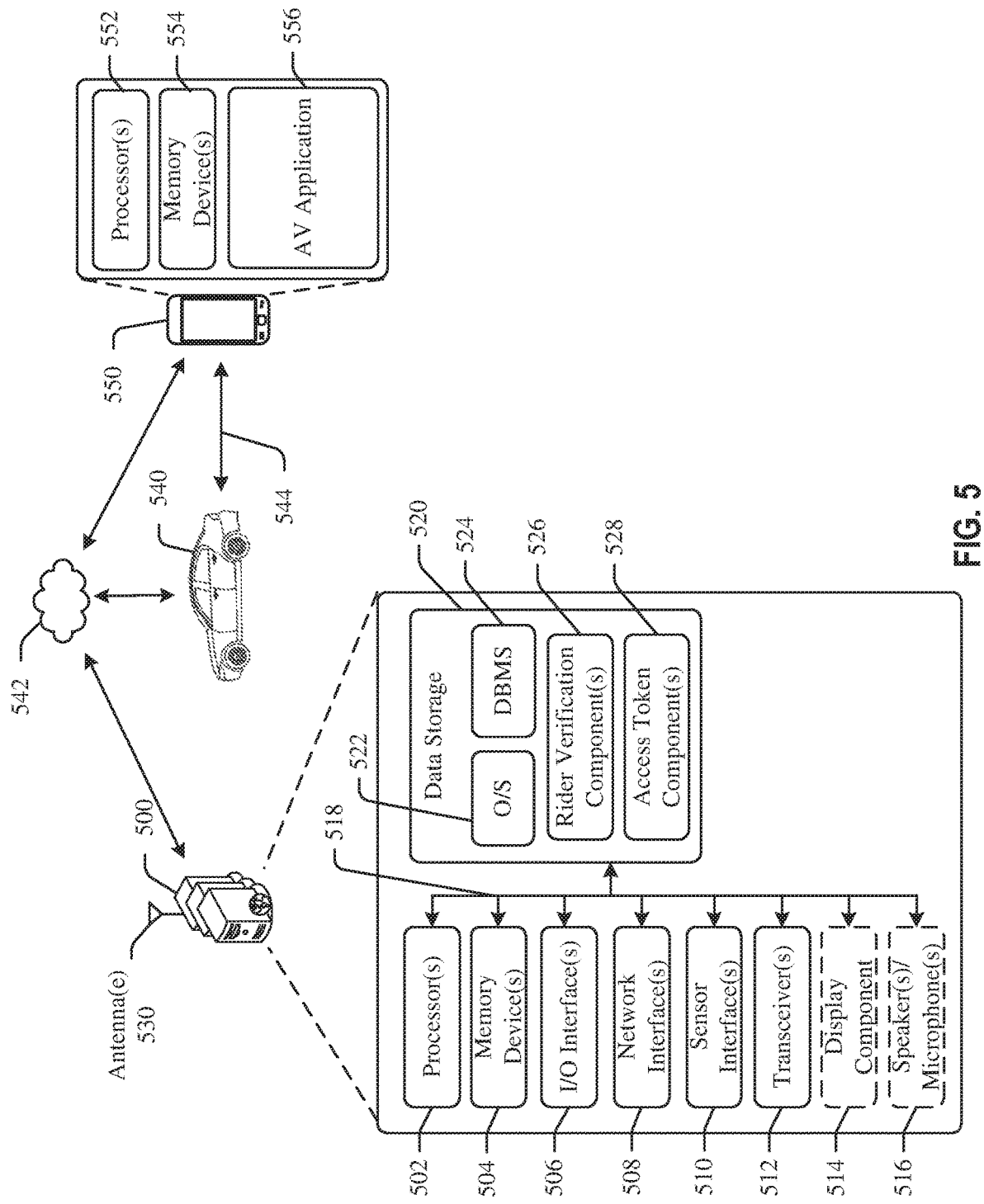
FIG. 5 is a schematic illustration of an example server architecture in accordance with one or more embodiments of the disclosure.

FIG. 5 is a schematic illustration of an example server architecture for one or more server(s) 500 in accordance with one or more embodiments of the disclosure. The server 500 illustrated in the example of FIG. 5 may correspond to either or both of the servers 160, 170 illustrated in FIG. 1 and discussed with respect to FIGS. 2-4. However, in some embodiments, the server 500 may include one, but not both, a rider verification component(s) 526 or an access token component(s) 528. For example, if the server 500 was the first cloud-based server 160, the server 500 may include the rider verification component(s) 526 and not the access token component(s) 528, whereas if the server 500 was the second cloud based server 170, the server 500 may include the access token component(s) 528 and not the rider verification component(s) 526. Some or all of the individual components may be optional and/or different in various embodiments. In some embodiments, at least one of the servers described in FIG. 1 and/or illustrated in FIG. 5 may be located at an autonomous vehicle.

The server 500 may be in communication with the autonomous vehicle 540, and one or more user devices 550. The autonomous vehicle 540 may be in communication with the user device 550.

The server 500, the autonomous vehicle 540, and/or the user device 550 may be configured to communicate via one or more networks 542. The autonomous vehicle 540 may additionally be in wireless communication 544 with the user device 550 via a connection protocol such as Bluetooth or Near Field Communication. Such network(s) 542 may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the server 500 may include one or more processors (processor(s)) 502, one or more memory devices 504 (also referred to herein as memory 504), one or more input/output (I/O) interface(s) 506, one or more network interface(s) 508, one or more sensor(s) or sensor interface(s) 510, one or more transceiver(s) 512, one or more optional display components 514, one or more optional camera(s)/microphone(s) 516, and data storage 520. The server 500 may further include one or more bus(es) 518 that functionally couple various components of the server 500. The server 500 may further include one or more antenna(e) 530 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 518 may include at least one of a system bus, a memory bus, an address bus, or a message bus, and may permit the exchange of information (e.g., data (including computer-executable code), signaling, etc.) between various components of the server 500. The bus(es) 518 may include, without limitation, a memory bus or a memory controller, a peripheral bus, an accelerated graphics port, and so forth. The bus(es) 518 may be associated with any suitable bus architecture.

The memory 504 of the server 500 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

The data storage 520 may include removable storage and/or non-removable storage including, but not limited to, magnetic storage, optical disk storage, and/or tape storage. The data storage 520 may provide non-volatile storage of computer-executable instructions and other data.

The data storage 520 may store computer-executable code, instructions, or the like that may be loadable into the memory 504 and executable by the processor(s) 502 to cause the processor(s) 502 to perform or initiate various operations. The data storage 520 may additionally store data that may be copied to the memory 504 for use by the processor(s) 502 during the execution of the computer-executable instructions. More specifically, the data storage 520 may store one or more operating systems (O/S) 522; one or more database management systems (DBMS) 524; and one or more program module(s), applications, engines, computer-executable code, scripts, or the like such as, for example, one or more rider verification component(s) 526 and/or one or more access token component(s) 528. Some or all of these component(s) may be sub-component(s). Any of the components depicted as being stored in the data storage 520 may include any combination of software, firmware, and/or hardware. The software and/or firmware may include computer-executable code, instructions, or the like that may be loaded into the memory 504 for execution by one or more of the processor(s) 502. Any of the components depicted as being stored in the data storage 520 may support functionality described in reference to corresponding components named earlier in this disclosure.

The processor(s) 502 may be configured to access the memory 504 and execute the computer-executable instructions loaded therein. For example, the processor(s) 502 may be configured to execute the computer-executable instructions of the various program module(s), applications, engines, or the like of the server 500 to cause or facilitate various operations to be performed in accordance with one or more embodiments of the disclosure. The processor(s) 502 may include any suitable processing unit capable of accepting data as input, processing the input data in accordance with stored computer-executable instructions, and generating output data. The processor(s) 502 may include any type of suitable processing unit.

Referring now to functionality supported by the various program component(s) depicted in FIG. 5, the rider verification component(s) 526 may include computer-executable instructions, code, or the like that responsive to execution by one or more of the processor(s) 502 may perform one or more blocks of the process flows 200 and process flow 300 and/or functions including, but not limited to, determining extracted feature data, matching extracted feature data to biometric templates, sending authentication identifiers to other servers, and the like.

The rider verification component(s) 526 may be in communication with the autonomous vehicle 540, user device 550, another server, and/or other components. For example, the rider verification component(s) 526 may receive extracted feature data from the autonomous vehicle, send authentication identifiers to another server, and so forth.

The access token component(s) 528 may include computer-executable instructions, code, or the like that responsive to execution by one or more of the processor(s) 502 may perform one or more blocks of the process flows 200 and process flow 300 and/or functions including, but not limited to, determining user account identifiers, receiving ride requests, determining authentication identifiers associated with user accounts, generating access tokens and wrong rider tokens, and the like.

The access token component(s) 528 may be in communication with the autonomous vehicle 540, user device 550, another server, and/or other components. For example, the access token component(s) 528 may send access tokens to the autonomous vehicle 540 and/or user device 550, receive authentication identifiers from other servers, and so forth.

Referring now to other illustrative components depicted as being stored in the data storage 520, the O/S 522 may be loaded from the data storage 520 into the memory 504 and may provide an interface between other application software executing on the server 500 and the hardware resources of the server 500.

The DBMS 524 may be loaded into the memory 504 and may support functionality for accessing, retrieving, storing, and/or manipulating data stored in the memory 504 and/or data stored in the data storage 520. The DBMS 524 may use any of a variety of database models (e.g., relational model, object model, etc.) and may support any of a variety of query languages.

Referring now to other illustrative components of the server 500, the input/output (I/O) interface(s) 506 may facilitate the receipt of input information by the server 500 from one or more I/O devices as well as the output of information from the server 500 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. The I/O interface(s) 506 may also include a connection to one or more of the antenna(e) 530 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, a ZigBee network, etc.

The server 500 may further include one or more network interface(s) 508 via which the server 500 may communicate with any of a variety of other systems, platforms, networks, devices, and so forth. The network interface(s) 508 may enable communication, for example, with one or more wireless routers, one or more host servers, one or more web servers, and the like via one or more networks.

The sensor(s)/sensor interface(s) 510 may include or may be capable of interfacing with any suitable type of sensing device such as, for example, inertial sensors, force sensors, thermal sensors, photocells, and so forth.

The display component(s) 514 may include one or more display layers, such as LED or LCD layers, touch screen layers, protective layers, and/or other layers. The optional camera(s) 516 may be any device configured to capture ambient light or images. The optional microphone(s) 516 may be any device configured to receive analog sound input or voice data. The microphone(s) 516 may include microphones used to capture sound.

It should be appreciated that the program module(s), applications, computer-executable instructions, code, or the like depicted in FIG. 5 as being stored in the data storage 520 are merely illustrative and not exhaustive and that processing described as being supported by any particular module may alternatively be distributed across multiple module(s) or performed by a different module.

It should further be appreciated that the server 500 may include alternate and/or additional hardware, software, or firmware components beyond those described or depicted without departing from the scope of the disclosure.

The user device 550 may include one or more computer processor(s) 552, one or more memory devices 554, and one or more applications, such as an autonomous vehicle application 556. Other embodiments may include different components.

The processor(s) 552 may be configured to access the memory 554 and execute the computer-executable instructions loaded therein. For example, the processor(s) 552 may be configured to execute the computer-executable instructions of the various program module(s), applications, engines, or the like of the device to cause or facilitate various operations to be performed in accordance with one or more embodiments of the disclosure. The processor(s) 552 may include any suitable processing unit capable of accepting data as input, processing the input data in accordance with stored computer-executable instructions, and generating output data. The processor(s) 552 may include any type of suitable processing unit.

The memory 554 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

Referring now to functionality supported by the user device 550, the autonomous vehicle application 556 may be a mobile application executable by the processor 552 that can be used to present options and/or receive user inputs of information related to autonomous vehicle ride requests, ride scheduling, and the like. In addition, the user device 550 may communicate with the autonomous vehicle 540 via the network 542 and/or a direct connection, which may be a wireless or wired connection. The user device 550 may include a camera, scanner, bio reader or the like to capture biometric data of a user, perform certain processing step on the biometric date, such as extracting features from captures biometric data, and then communicated those extracted features to one or more remote servers, such as one or more of cloud-based servers 160,170. The user device may also, via the AV application 556, facilitate enrollment, an example of which is discussed herein with reference to FIG. 3, as well as receive and process access tokens and wrong rider tokens.

It should be appreciated that the program module(s), applications, computer-executable instructions, code, or the like depicted in FIG. 5 as being stored in the data storage 520 are merely illustrative and not exhaustive and that processing described as being supported by any particular module may alternatively be distributed across multiple module(s) or performed by a different module.

It should further be appreciated that the server 500 may include alternate and/or additional hardware, software, or firmware components beyond those described or depicted without departing from the scope of the disclosure.

One or more operations of the methods, process flows, and use cases of FIGS. 1-5 may be performed by a device having the illustrative configuration depicted in FIG. 5, or more specifically, by one or more engines, program module(s), applications, or the like executable on such a device. It should be appreciated, however, that such operations may be implemented in connection with numerous other device configurations.

The operations described and depicted in the illustrative methods and process flows of FIGS. 1-5 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-5 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

According to an aspect of the disclosure, a method may include receiving, by a first cloud-based server configured to verify user identities using biometric features, first extracted feature data from a user device, the first extracted feature data representing biometric features of a user, determining, by the first cloud-based server, that the first extracted feature data matches an authentication identifier, and sending, by the first cloud-based server, the authentication identifier to a second cloud-based server configured to generate rider verification tokens for access to autonomous vehicles. The method may include determining, by the second cloud-based server, a user account associated with the authentication identifier, determining, by the second cloud-based server, that the user account matches an expected user account, and sending, by the second cloud-based server, a rider verification token to an autonomous vehicle for the user to access the autonomous vehicle.

According to another aspect of this disclosure, a method may include sending, by a user device comprising one or more computer processors coupled to at least one memory, a first request for an authentication identifier to a first cloud-based server, wherein the authentication identifier is associated with a first user account for a user of an autonomous vehicle, determining, by the user device, baseline extracted feature data representing biometric features of the user, sending, by the user device, the authentication identifier and the baseline extracted feature data in an encrypted format to a second cloud-based server, wherein the second cloud-based server is configured to use the baseline extracted feature data for biometric authentication, and deleting, by the user device, the authentication identifier.

According to yet another aspect of this disclosure, a first cloud-based server may include at least one memory comprising computer-executable instructions, and one or more computer processors configured to access the at least one memory and execute the computer-executable instructions to: receive, by the first cloud-based server configured to verify user identities using biometric features, first extracted feature data from a user device, the first extracted feature data representing biometric features of a user, determine, by the first cloud-based server, that the first extracted feature data matches an authentication identifier, and send, by the first cloud-based server, the authentication identifier to a second cloud-based server configured to generate rider verification tokens for access to autonomous vehicles.

Example embodiments may include one or more of the following:

Example 1 may include a method comprising: receiving, by a first server from an autonomous vehicle, first extracted feature data, the first extracted feature data representing biometric features of a user; determining, by the first server, that the first extracted feature data is associated with an authentication identifier; sending, by the first server, the authentication identifier to a second server; determining, by the second server, a first user account associated with a ride request for the autonomous vehicle; determining, by the second server, that the first user account is associated with the authentication identifier; and sending, by the second server, an access token to the autonomous vehicle.

Example 2 may include the method of example 1 and/or some other example herein, wherein the authentication identifier is a first authentication identifier, the method further comprising: receiving, by the first server, second extracted feature data from the autonomous vehicle; determining, by the first server, that the second extracted feature data is associated with a second authentication identifier; sending, by the first server, the second authentication identifier to the second server; receiving, by the second server, the second authentication identifier from the first server; determining, by the second server, a second user account associated with the second authentication identifier; determining, by the second server, that the user account does not match an expected user account; and sending, by the second server, a wrong rider token to the autonomous vehicle.

Example 3 may include the method of example 1 and/or some other example herein, wherein the wrong rider token comprises data related to a location of a different autonomous vehicle for the user.

Example 4 may include the method of example 1 and/or some other example herein, wherein the autonomous vehicle is prevented from accessing the authentication identifier.

Example 5 may include the method of example 1 and/or some other example herein, further comprising: deleting, by the second server, the authentication identifier after sending the access token to the autonomous vehicle.

Example 6 may include the method of example 1 and/or some other example herein, wherein the first extracted feature data is derived from an image of the user's face.

Example 7 may include the method of example 1 and/or some other example herein, wherein the first server uses a neural net for biometric authentication of the user.

Example 8 may include the method of example 1 and/or some other example herein, further comprising: sending, by the first server, the authentication identifier to a user device for storage in RAM memory during an enrollment process.

Example 9 may include a method comprising: sending, by a user device comprising one or more computer processors coupled to at least one memory, a first request for an authentication identifier to a first server, wherein the authentication identifier is associated with a first user account for a user of an autonomous vehicle; determining, by the user device, baseline extracted feature data representing biometric features of the user; sending, by the user device, the authentication identifier and the baseline extracted feature data in an encrypted format to a second server, wherein the second server is configured to use the baseline extracted feature data for biometric authentication; and deleting, by the user device, the authentication identifier.

Example 10 may include the method of example 9 and/or some other example herein, further comprising: receiving the authentication identifier from the first server; and storing the authentication identifier in RAM memory.

Example 11 may include the method of example 9 and/or some other example herein, further comprising: determining an image of the user; determining first extracted feature data using the image; sending a biometric authentication request to the second server, the biometric authentication request comprising the first extracted feature data; and determining that the user is to be granted access to the autonomous vehicle.

Example 12 may include the method of example 9 and/or some other example herein, wherein the first server, the second server, and the user device do not send the authentication identifier to the autonomous vehicle.

Example 13 may include the method of example 9 and/or some other example herein, wherein the authentication identifier does not include personally identifiable information.

Example 14 may include a first server comprising: means for receiving first extracted feature data from a device, the first extracted feature data representing biometric features of a user; means for determining that the first extracted feature data matches an authentication identifier; and means for sending the authentication identifier to a second server configured to generate access tokens for an autonomous vehicle.

Example 15 may include the first server of example 14 and/or some other example herein, wherein the second server determines that a user account associated with the authentication identifier matches an expected user account.

Example 16 may include the first server of example 14 and/or some other example herein, wherein the second server sends an access token to an autonomous vehicle for the user to access the autonomous vehicle.

Example 17 may include the first server of example 14 and/or some other example herein, wherein the authentication identifier is only accessible by the first server and the second server.

Example 18 may include the first server of example 14 and/or some other example herein, wherein the second server deletes the authentication identifier after sending an access token to the autonomous vehicle.

Example 19 may include the first server of example 14 and/or some other example herein, wherein the first extracted feature data is derived from an image of the user's face.

Example 20 may include the first server of example 14 and/or some other example herein, wherein the first server uses a neural net for user identity authentication.

Example 21 may include an autonomous vehicle comprising: at least one memory storing computer-executable instructions; and one or more computer processors coupled to the at least one memory and configured to execute the computer-executable instructions to: receive biometric data of a user; determine extracted feature data using the biometric data; send the extracted feature data to a first server; and receive an access token from a second server, wherein the access token indicates the extracted feature data matched stored data associated with a user account of the user.

Example 22 may include the method of example 21 and/or some other example herein, wherein the one or more computer processors are configured to receive biometric data of the user by executing the computer-executable instructions to: receive biometric data of the user from a user device wirelessly connected to the autonomous vehicle.

Example 23 may include the method of example 21 and/or some other example herein, wherein the one or more computer processors are further configured to execute the computer-executable instructions to: determine that the access token matches an expected key value to unlock the autonomous vehicle.

Example 24 may include the method of example 21 and/or some other example herein, wherein the access token causes the autonomous vehicle to unlock a door or initiate a trip.

Example 25 may include means for receiving biometric data of a user; means for determining extracted feature data using the biometric data; means for sending the extracted feature data to a first server; and means for receiving an access token from a second server, wherein the access token indicates the extracted feature data matched stored data associated with a user account of the user.

Example 26 may include means for receiving first extracted feature data, the first extracted feature data representing biometric features of a user; means for determining that the first extracted feature data is associated with an authentication identifier; means for sending the authentication identifier to a second server; means for determining a first user account associated with a ride request for the autonomous vehicle; means for determining that the first user account is associated with the authentication identifier; and means for sending an access token to the autonomous vehicle.

Example 27 may include means for sending, by a user device comprising one or more computer processors coupled to at least one memory, a first request for an authentication identifier to a first server, wherein the authentication identifier is associated with a first user account for a user of an autonomous vehicle; means for determining, by the user device, baseline extracted feature data representing biometric features of the user; means for sending, by the user device, the authentication identifier and the baseline extracted feature data in an encrypted format to a second server, wherein the second server is configured to use the baseline extracted feature data for biometric authentication; and means for deleting, by the user device, the authentication identifier.

What is claimed is:

1. A method comprising:
  receiving, by a first server from an autonomous vehicle, first extracted feature data, the first extracted feature data representing biometric features of a user;
  determining, by the first server, that the first extracted feature data is associated with an authentication identifier;
  sending, by the first server, the authentication identifier to a second server;
  determining, by the second server, a first user account associated with a ride request for the autonomous vehicle;
  determining, by the second server, that the first user account is associated with the authentication identifier; and
  sending, by the second server, an access token to the autonomous vehicle,
  wherein the autonomous vehicle is prevented from accessing the authentication identifier.

2. The method of claim 1, wherein the authentication identifier is a first authentication identifier, the method further comprising:
  receiving, by the first server, second extracted feature data from the autonomous vehicle;
  determining, by the first server, that the second extracted feature data is associated with a second authentication identifier;
  sending, by the first server, the second authentication identifier to the second server;
  receiving, by the second server, the second authentication identifier from the first server;
  determining, by the second server, a second user account associated with the second authentication identifier;
  determining, by the second server, that the user account does not match an expected user account; and
  sending, by the second server, a wrong rider token to the autonomous vehicle.

3. The method of claim 2, wherein the wrong rider token comprises data related to a location of a different autonomous vehicle.

4. The method of claim 1, further comprising:
  deleting, by the second server, data associated with the ride request after sending the access token to the autonomous vehicle.

5. The method of claim 1, wherein the first extracted feature data is derived from an image of a face of the user.

6. The method of claim 1, wherein the first server uses a neural net for biometric authentication of the user.

7. The method of claim 1, further comprising:
  receiving, by the second server, the ride request comprising the first user account from a user device.

8. A method comprising:
  receiving, by a first server from an autonomous vehicle, first extracted feature data, the first extracted feature data representing biometric features of a user;
  determining, by the first server, that the first extracted feature data is associated with an authentication identifier;
  sending, by the first server, the authentication identifier to a second server;
  determining, by the second server, a first user account associated with a ride request for the autonomous vehicle;
  determining, by the second server, that the first user account is associated with the authentication identifier;
  sending, by the second server, an access token to the autonomous vehicle, wherein the authentication identifier is a first authentication identifier, the method further comprising:
  receiving, by the first server, second extracted feature data from the autonomous vehicle;
  determining, by the first server, that the second extracted feature data is associated with a second authentication identifier;
  sending, by the first server, the second authentication identifier to the second server;
  receiving, by the second server, the second authentication identifier from the first server;
  determining, by the second server, a second user account associated with the second authentication identifier;
  determining, by the second server, that the user account does not match an expected user account; and
  sending, by the second server, a wrong rider token to the autonomous vehicle.

9. The method of claim 8, wherein the wrong rider token comprises data related to a location of a different autonomous vehicle.

10. The method of claim 8, wherein the autonomous vehicle is prevented from accessing the authentication identifier.

* * * * *